(12) United States Patent
Showalter

(10) Patent No.: US 9,151,345 B2
(45) Date of Patent: Oct. 6, 2015

(54) ACTUATOR FOR MULTI-MODE CLUTCH MODULE

(71) Applicant: BorgWarner, Inc., Auburn Hills, MI (US)

(72) Inventor: Dan Showalter, Suttons Bay, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 14/293,030

(22) Filed: Jun. 2, 2014

(65) Prior Publication Data

US 2015/0060222 A1 Mar. 5, 2015

Related U.S. Application Data

(60) Provisional application No. 61/872,114, filed on Aug. 30, 2013.

(51) Int. Cl.
*F16D 41/16* (2006.01)
*F16D 43/14* (2006.01)

(52) U.S. Cl.
CPC .......... *F16D 41/16* (2013.01); *F16D 2043/145* (2013.01)

(58) Field of Classification Search
None
See application file for complete search history.

(56) References Cited

U.S. PATENT DOCUMENTS

| | | | |
|---|---|---|---|
| 4,222,473 A * | 9/1980 | Kopich | 192/43.1 |
| 5,992,592 A * | 11/1999 | Showalter | 192/43.1 |
| 2004/0238306 A1* | 12/2004 | Reed et al. | 192/43.1 |
| 2008/0000747 A1* | 1/2008 | Saka | 192/43.2 |
| 2008/0223681 A1* | 9/2008 | Stevenson et al. | 192/43 |
| 2012/0090952 A1* | 4/2012 | Lee et al. | 192/41 R |
| 2012/0138411 A1 | 6/2012 | Samie et al. | |
| 2012/0165146 A1* | 6/2012 | Samie et al. | 475/5 |

\* cited by examiner

*Primary Examiner* — Rodney H Bonck
(74) *Attorney, Agent, or Firm* — Miller, Matthias & Hull LLP

(57) ABSTRACT

A transmission clutch module including inner and outer races, a plurality of race engaging pawls and an actuator ring incorporates an actuator having a rotatable spool header adapted to rotate an attached actuator lever between at least two angular positions. The actuator lever moves the actuator ring to selectively block the pawls so inner and outer races may freewheel relative to one another in at least one operating mode. The actuator may be electric or hydraulic powered, and may be spring-biased to a default position in event of power failure. An elongated axially moveable plunger is secured to and supported within a piston at a first end, and has a radially extending pin at its second end. A fixed spool sleeve to which the spool header is supported includes a helical slot through which the pin extends. As the plunger moves reciprocally, the pin undergoes both translational and rotational movement.

20 Claims, 5 Drawing Sheets

ACTUATOR FOR MULTI-MODE CLUTCH MODULE

FIELD OF DISCLOSURE

The present disclosure relates generally to overrunning clutches for automotive transmissions, and more particularly to multiple mode clutch actuators employed in operation of such transmissions.

BACKGROUND OF DISCLOSURE

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutches adapted to dynamically shift among variously available gear ratios without requiring driver intervention. Pluralities of clutches, also called clutch modules, are incorporated within such transmissions to facilitate the automatic gear ratio changes.

In an automatic transmission for an automobile, anywhere from three to ten forward gear ratios may be available, not including a reverse gear. The various gears may be structurally comprised of inner gears, intermediate gears such as planet or pinion gears supported by carriers, and outer ring gears. Specific transmission clutches may be associated with specific sets of the selectable gears within the transmission to facilitate the desired ratio changes.

Because automatic transmissions include pluralities of gear sets to accommodate multiple gear ratios, friction drag is a constant issue; the drag arises from mechanical interactions of the various parts employed. Much effort has been directed to finding ways to reduce friction drag within automatic transmission components and systems.

For example, one of the clutch modules of an automatic transmission associated with first (low) and reverse gear ratios may be normally situated at the front of the transmission and closely adjacent the engine crankshaft. The clutch may have an inner race and an outer race disposed circumferentially about the inner race. One of the races, for example the inner race, may be drivingly rotatable in only one direction. The inner race may be selectively locked to the outer race via an engagement mechanism such as, but not limited to, a roller, a sprag, or a pawl, as examples. In the one direction, the inner race may be effective to directly transfer rotational motion from the engine to the driveline.

Within the latter system, the outer race may be fixed to an internal case or housing of an associated planetary member of the automatic transmission. Under such circumstances, in a first configuration the inner race may need to be adapted to drive in one rotational direction, but freewheel in the opposite direction, in a condition referred to as overrunning. Those skilled in the art will appreciate that overrunning may be particularly desirable under certain operating states, as for example when a vehicle is traveling downhill. Under such circumstance, a driveline may occasionally have a tendency to rotate faster than its associated engine crankshaft. Providing for the inner race to overrun the outer race may avoid damage to the engine and/or transmission components.

In a second configuration, such as when a vehicle may be in reverse gear, the engagement mechanisms may be adapted for actively engaging in both rotational directions of the inner race, thus not allowing for the overrunning condition in the non-driving direction.

Above certain thresholds of rotational speed, the need for interaction of the engagement mechanisms, particularly those associated with the first (low) and/or reverse gear ratios, may become unnecessary. Thus, rather than contributing to drag, for example at highway speeds, there is substantial motivation to reduce and/or avoid interaction of the engagement mechanisms with any of the clutch parts, particularly those associated with the low/reverse clutch module.

SUMMARY OF DISCLOSURE

In accordance with one aspect of the disclosure, an actuator for a multi-mode clutch module is disclosed. The clutch module comprises an inner race; a fixed outer race disposed concentrically about the inner race, and a plurality of engagement mechanisms circumferentially disposed between the inner and outer races. Each engagement mechanism is adapted to provide a locked position, wherein, via the actuator, the mechanism locks the inner race to the outer race in a driving rotational direction, and an unlocked position that allows the inner race to freewheel in an opposite, non-driving, rotational direction.

In accordance with another aspect, the multi-mode clutch module includes an actuator ring having two positions, one position locking a first, driving directional, rotational motion of the inner race, but allowing the inner race to freewheel in an opposed second direction.

In accordance with another aspect, the actuator ring of the clutch module incorporates a second position that assures the locking of the inner race in both directions of rotational motion with respect to the outer race.

In yet another aspect, the engagement mechanisms may be adapted to centrifugally disengage from the races at a specific rotational speed of the inner race.

These and other aspects and features of the present disclosure may be better appreciated by reference to the following detailed description and accompanying drawings.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
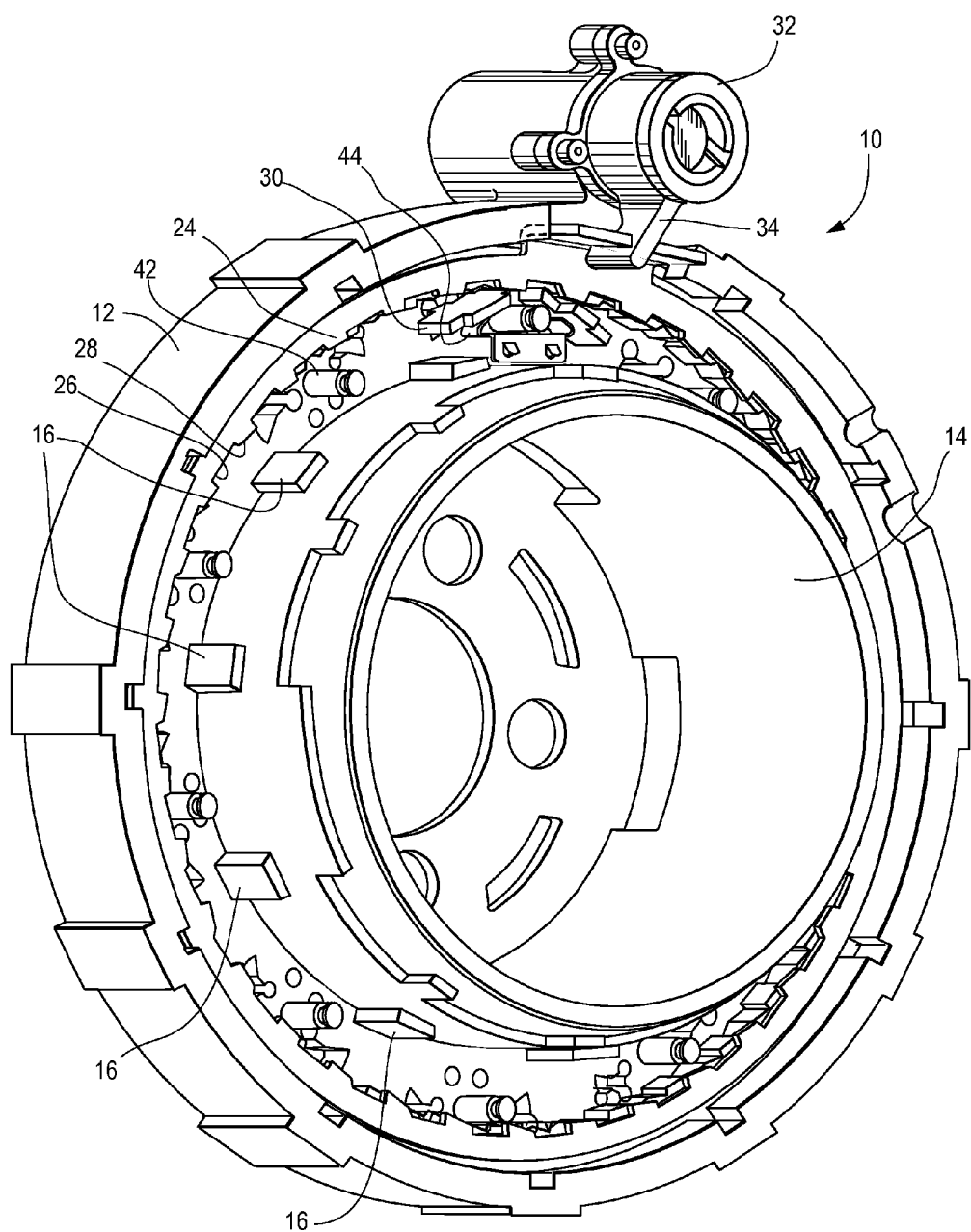
FIG. 1 is a perspective view of an automatic transmission clutch module that includes an actuator constructed in accordance with the present disclosure, the clutch module being shown with one of its two inner race plates removed to reveal certain details.

Referring to FIG. 1, a clutch module 10 may be adapted to be utilized as a sub-unit of an automatic transmission (not shown). Such a transmission may be employed in a front-wheel driven automobile, for example. The clutch module 10 may include an exterior case or housing 12, as well as an interior driven hub 14 adapted for transfer of power from an engine (not shown) to a vehicular driveline (not shown).

Figure 2:
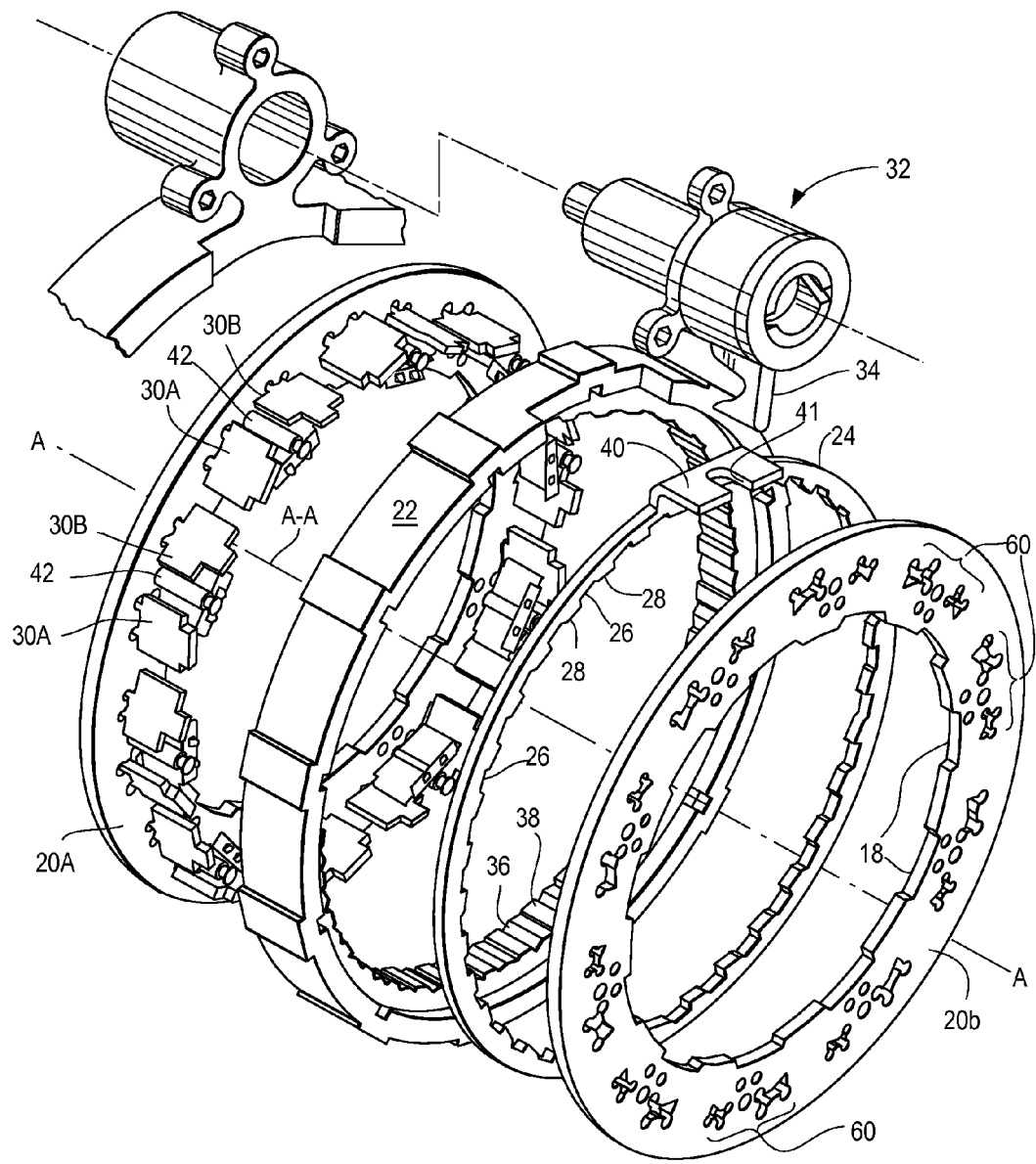
FIG. 2 is an exploded view of various interactive parts of the clutch module and actuator of FIG. 1, constructed in accordance with the present disclosure.

Axially oriented, circumferentially spaced cogs 16 are provided on the outside periphery of the interior driven hub 14. Referring now also to FIG. 2, an inner race 20 is formed as two plates 20A and 20B spaced along an axis "A-A". The cogs 16 are adapted for supporting rotary movement of the plates along the axis. For this purpose, the plates 20A and 20B have circumferentially spaced detents 18 on their inside peripheries; the detents are adapted to engage the cogs 16.

With specific reference now to FIG. 2, an outer race 22 is situated between the two inner race plates 20A and 20B. Although the inner race plates 20A and 20B are specifically displayed in this disclosure as ring structures, other configurations may be suitable for use within the scope of this disclosure. The outer race 22 is rotationally fixed with respect to the interior of the exterior case or housing 12 as shown within the multi-mode clutch module 10, and an actuator ring 24 is situated between the outer race 22 and the plate 20B of the inner race 20. The actuator ring 24 is adapted to be rotated over a small angle about the axis A-A between two circumferentially spaced positions, as further described below. Within its interior periphery, the actuator ring 24 incorporates a strategically situated array of circumferentially spaced recesses, herein called slots 26, defined by and situated between projections, herein called teeth 28. The slots 26 and teeth 28 are adapted to interact with pawls 30, as now described.

As depicted and disclosed herein, the pawls 30 are elongated hardened steel members circumferentially positioned about the axis A-A of the clutch module 10. Alternatively, the pawls maybe forgings or other manufactured structures, otherwise generally adapted to handle required loads of engagement between the inner and outer races 20, 22, as necessary for any particular clutch design. To accommodate interactions in both directions of relative rotation between the inner race 20 and the outer race 22, the pawls are arranged in sets of opposed pairs, 30A and 30B, as shown. The actuator ring 24 is adapted to selectively block interactions of the pawls 30A and 30B between the inner race 20 and the outer race 22, as further described below.

Figure 3:
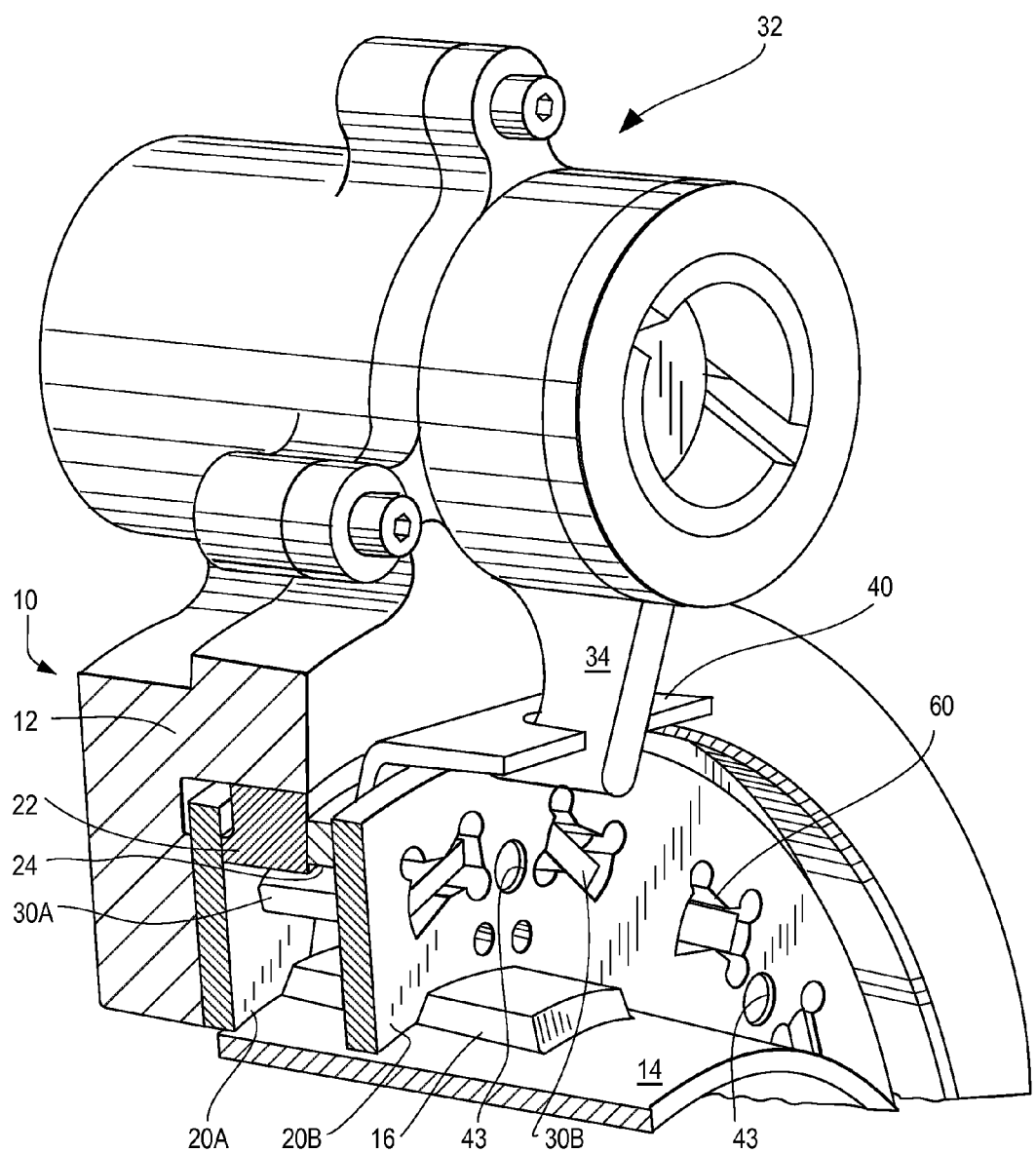
FIG. 3 is a perspective cross-sectional view of a portion of a fully assembled clutch module and actuator of FIG. 1.

A hydraulic actuator 32 (FIGS. 1, 2, and 3) is secured to the module housing 12, and includes an actuator lever 34, which in turn moves an actuator tab 40 (FIGS. 2 and 3). The axially projecting actuator tab 40 is formed on a peripheral edge of the actuator ring 24; the ring 24 rotates between two angularly spaced positions, as noted above. Referring now more specifically to FIG. 3, the inner race plates 20A and 20B, the outer race 22, and the actuator ring 24 are shown assembled within the cross-sectioned partial view of the clutch module 10. Axially extending rivets 42 (FIG. 2) are used to secure the two inner race plates 20A and 20B together. The rivets 42 extend through apertures 43 (FIG. 3) in each of the plates 20A and 20B to hold the two plates rigidly together, and to assure against any relative rotation between respective plates. In lieu of the rivets 42, other structural fasteners may be employed within the scope of this disclosure to secure the inner race plates 20A, 20B together.

In view of the foregoing, it will be appreciated that the actuator 32 controls movement of the actuator tab 40 which, in turn, rotates the actuator ring 24 between the two angular positions. Actual positioning of the pawls 30A and 30B, axially retained between the riveted inner race plates 20A and 20B, is directly controlled by the actuator ring 24 against forces of pawl springs 44, as further described below.

Referring now specifically to FIG. 3, it will be noted that the two inner race plates 20A and 20B, are adapted to rotate within the case or housing 12. If the actuator ring 24 is in the first of its two specific angular positions, one set of the pawls, e.g. pawls 30B, will lock the inner race 20 (i.e., plates 20A and 20B) to the outer race 22, to drivingly rotate in one direction, for example counterclockwise. In the opposite rotational direction, e.g. clockwise, the pawls 30A will be unlocked whenever the clutch module 10 in an automatic first or drive gear configuration so as to permit freewheeling of the inner race 20 relative to the outer race 22.

Alternatively, when the actuator ring 24 is in the second of its two angular positions, both sets of pawls 30A and 30B, will lock the inner race to the outer race in either rotational direction to accommodate a reverse or manual first gear configuration; i.e. when in a mode during which no overrunning is desirable. In both configurations of the multi-mode clutch, it will be noted that the outer race 22 remains non-rotatable relative to the exterior case or housing 12. For accommodating desired engagement with the pawls 30A and 30B, the inner circumference of the outer race 22 (FIG. 2; see bottom portion thereof) contains circumferentially spaced notches 36, each defined by and situated between pairs of radially inwardly projecting cogs 38.

Figure 4A:
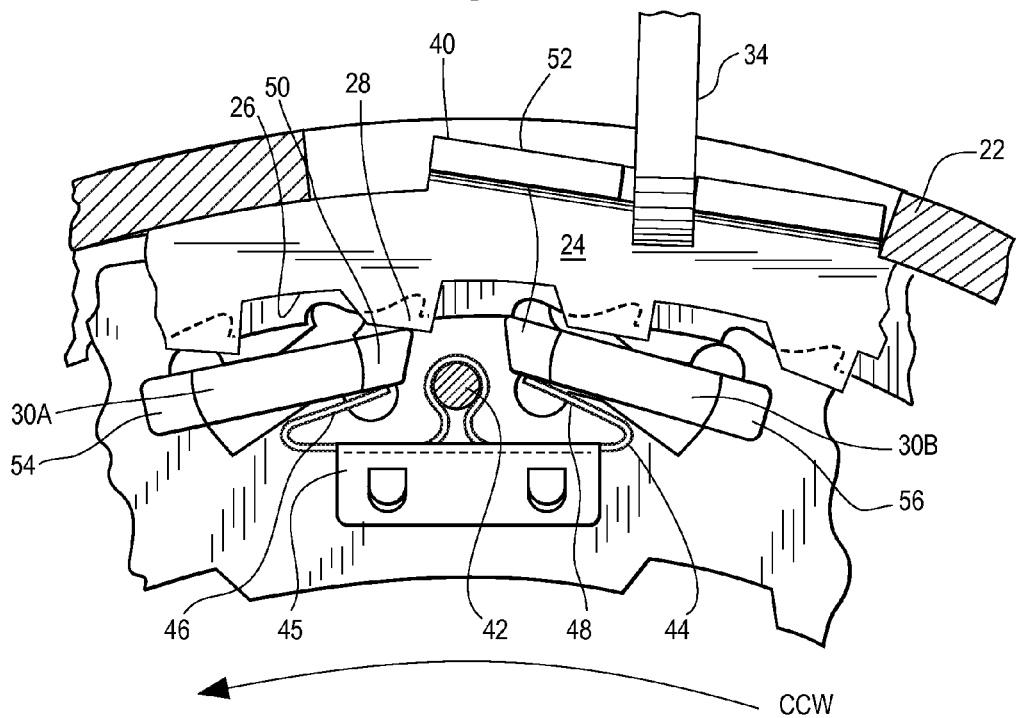
FIG. 4A is an enlarged side view of a portion of the clutch module of FIG. 1, again with one of two inner race plates removed to reveal a pair of engagement mechanisms interacting with an actuator ring, shown with the clutch inner race adapted to be fixed or locked to the outer race when in a driving rotational direction of the inner race, and a freewheel position when in the opposite or non-driving rotational direction (one-way mode).
Figure 5A:
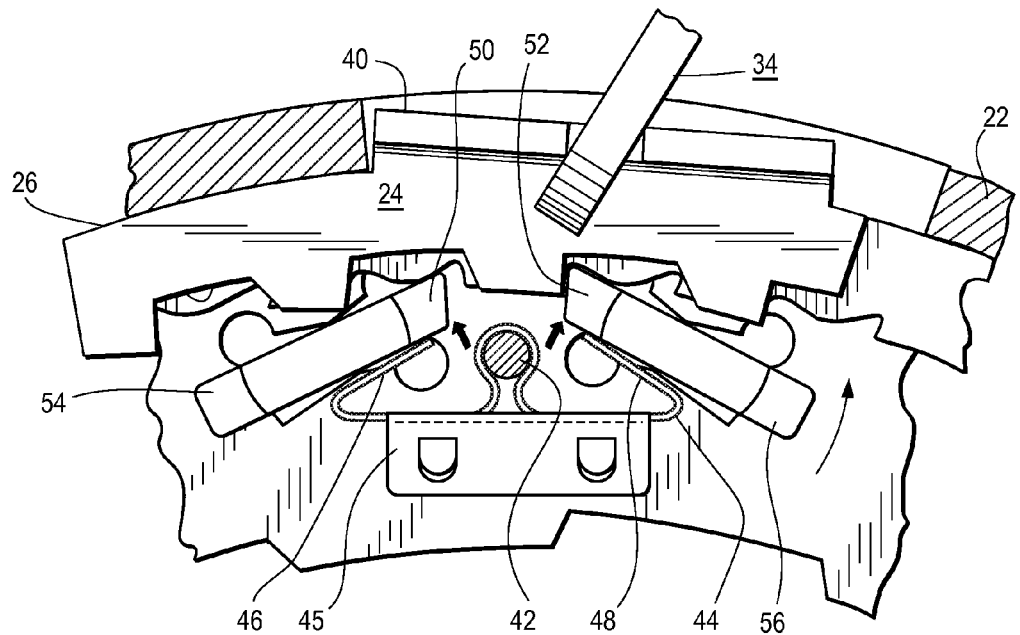
FIG. 5A is a similar enlarged side view of the clutch engagement mechanism of FIG. 4A, but shown with the clutch inner race adapted to be fixed or locked to the outer race in both driving and non-driving rotational directions (locked mode).

Referring now to FIGS. 4A and 5A, first and second angular positions of the actuator tab 40 are depicted, respectively. In FIG. 4A, the actuator tab 40 is shown in a first (angularly rightward) selectable position, representative of the first described one-way clutch mode. In the latter configuration, the actuator ring 24 is positioned so that toe ends 50 of the pawls 30A are blocked by teeth 28 from engagement with the notches 36, and hence with the cogs 38 on the interior of the outer race 22. As such the inner race 20 is enabled to freewheel relative to the outer race 22, and to thus provide for an overrunning condition when the inner race 20 is rotating clockwise as shown. Conversely, however, the position of the actuator ring 24 allows of the toe ends 52 of the pawls 30B to engage the actuator slots 26 of the actuator ring 24, and to thereby directly engage the cogs 38 of the outer race 22 to lock the inner and outer races, 20 and 22 together whenever the inner race 20 undergoes a driving, or counterclockwise (CCW) rotational movement, as indicated by arrow.

In FIG. 5A, the actuator tab 40 is shown in a second (angularly leftward) selectable position, representative of a manual first or reverse gear mode. In the latter configuration, the actuator ring 24 is positioned so that the toe ends 50, 52 of both sets of the pawls 30A and 30B engage the actuator slots 26 of the actuator ring 24, and interact with the outer race 22 as described above to lock the inner race 20 to the outer race 22, irrespective of the rotational direction of the inner race 20.

Continuing reference now to both FIGS. 4A and 5A, the pawls 30A and 30B are asymmetrically shaped, and reversely identical. Each pair of the opposed pawls is movably retained within its own bowtie-shaped pawl aperture 60 (FIG. 3) of the respective inner race plates 20A and 20B. Each individual pawl 30A, 30B is urged radially outwardly via a single spring 44. Each spring has a base 45, and a pair of spring arms 46 and 48. The spring arms 46 bear against the bottoms of the pawls 30A, while the spring arms 48 bear against the bottoms of the pawls 30B, each to urge respective toe ends 50, 52 into engagement with the cogs 38 of the outer race 22.

Although the use of a leaf-style spring is depicted and described herein, an alternative type of spring or even other biasing arrangements may be employed. For example, a pair of coil springs could be used; e.g., one for each of the pair of opposed pawls 30A, 30B.

Opposite each toe end 50 and 52, each pawl 30A and 30B has a heel end 54 and 56, respectively (FIGS. 4A and 5A). As already described, the slots 26 in the interior circumference of the actuator ring 24 can be selectively positioned so that each toe end 50, 52 engages a notch 36 (FIG. 2) of the outer race 22 to permit the toe ends to engage outer race cogs 38 (FIG. 2) in the interior circumference of the outer race 22 to physically lock the inner and outer races together.

Operationally, radially inwardly depending actuator ring teeth 28 are adapted to selectively block such toe ends 50, 52 of the pawls 30 from being urged radially outwardly by respective spring arms 46, 48 and into notches 36. The interaction of the teeth 28 with such toe ends 50, 52 defines the mechanism that permits the earlier described freewheeling of the inner race 20 relative to the outer race 22 as, for example, in the case of the above-described configuration for manual first or reverse gear.

In the immediate disclosure, the heel ends 54 and 56 may be designed to contain more mass than the toe ends 50, 52, so that at a particular threshold rotational speed of the inner race 20, the heel ends will tend to swing radially outwardly under centrifugal forces of rotation. This action will cause the toe ends 50, 52 to become disengaged from notches 36 of the outer race 22. As such, the inner race 20 will become disengaged from the outer race 22. Under such forces, the toe ends of pawls 30A will bear down against the spring arms 46, while the toe ends 52 of pawls 30B will respectively bear against spring arms 48. In each case, the differential in mass between heel and toe ends must be designed to 1) overcome the resistive forces imposed by the respective spring arms 46, 48 of the springs 44, and 2) achieve such centrifugal force induced load against the respective spring arms 46, 48 at a specific rotational speed threshold.

Thus, in either of the first or reverse gear configurations of the clutch module 10, and at rotational speeds of the inner race 20 in excess of a threshold of 500 RPM, for example, the pawls 30A and 30B of the clutch module 10 are adapted to become disengaged under centrifugal forces imposed thereon by a predetermined speed of rotation. At such threshold speed, the centrifugal forces will be sufficient to overcome the radially opposing forces of the spring arms 46, 48, and the toe ends 50, 52 of the pawls will disengage. As such, this disclosure offers an effective way to reduce and/or avoid parasitic drag loads within the clutch module.

Figure 4B:
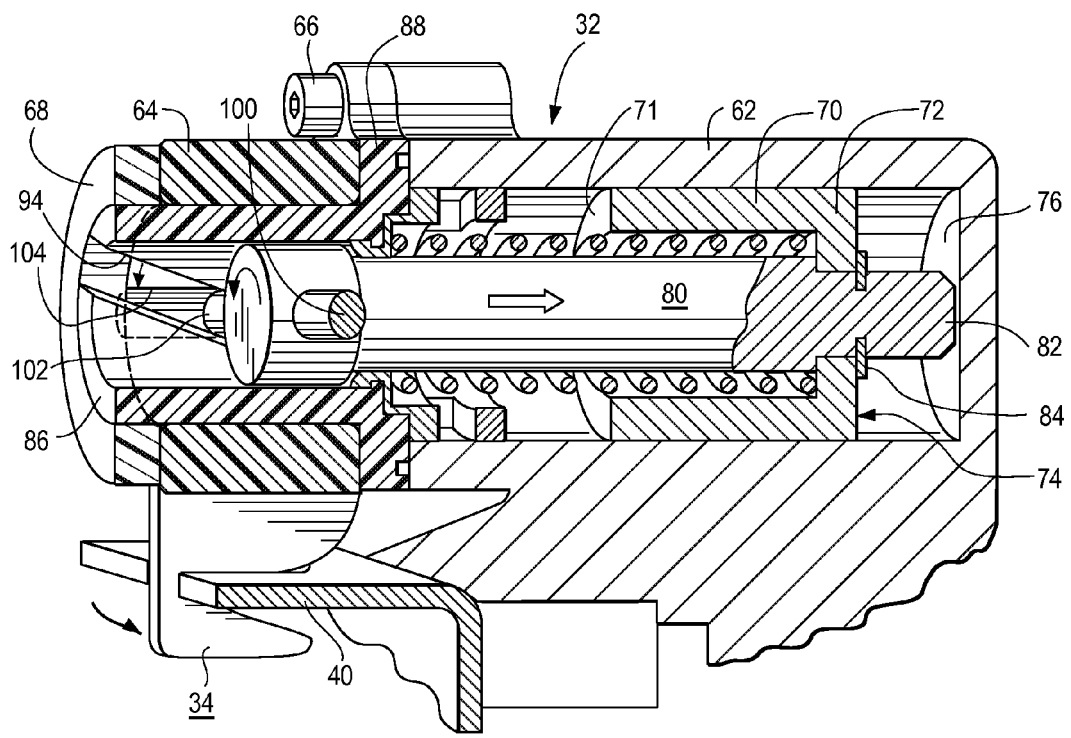
FIG. 4B is a cross-sectional side view, shown in perspective, of the actuator having its piston and plunger portions in positions reflective of the locked position in the driving rotational direction of the clutch inner race, and freewheel position in the opposite non-driving rotational direction (one-way mode).
Figure 5B:
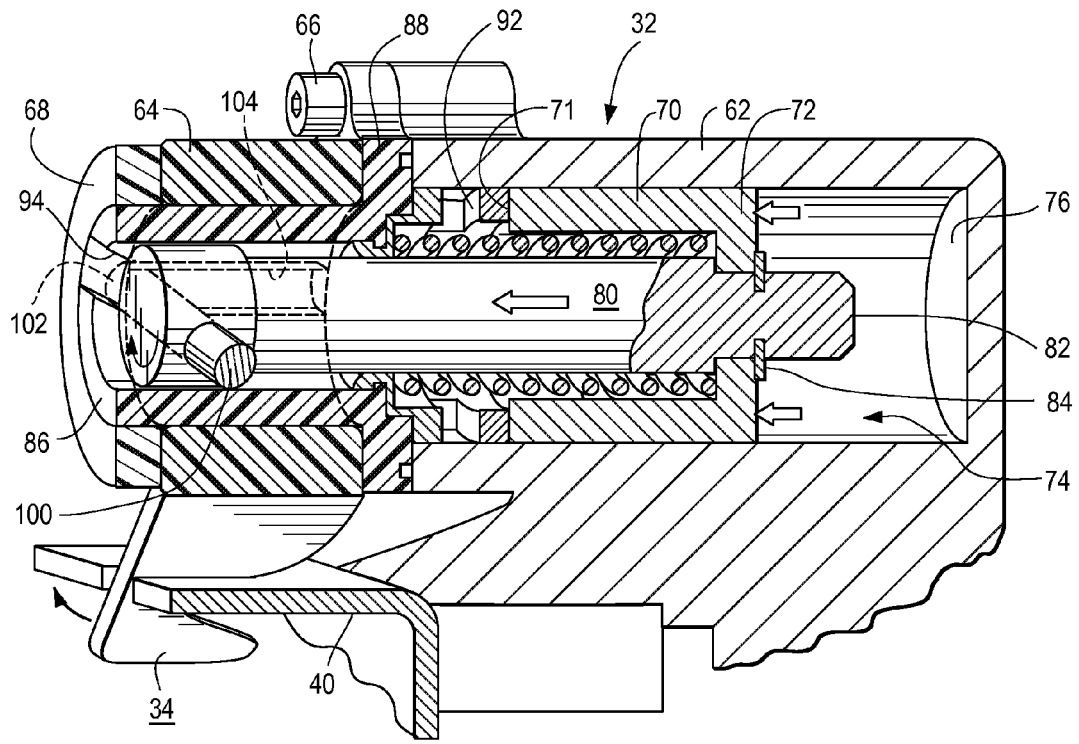
FIG. 5B is a similar cross-sectional side view of the actuator of FIG. 4B, but with the actuator having its piston and plunger portions shown in positions reflective of the clutch inner race being locked to the outer race in both driving and non-driving rotational directions (locked mode).

Referring now more particularly to FIGS. 4B and 5B, the interior operating structure of the actuator 32 is shown in detail. The actuator 32 includes an actuator lever 34 rotatable between the two angular limits of rotation, as previously described in reference to FIGS. 2 and 3. The lever 34 extends into a slot 41 of the actuator tab 40, as best viewed in FIG. 2.

FIG. 4B depicts the lever 34 in a one-way clutch mode position corresponding to FIG. 4A. Conversely, FIG. 5B depicts the lever 34 in its opposite position in which the inner and outer races are locked in both directions, corresponding to FIG. 5A. The actuator 32 includes an exterior housing 62 affixed to the clutch module housing 12, and to which is secured a rotatable spool header 64 from which the moveable lever 34 radially extends into the slot 41. The rotatable spool header 64 is axially mounted on a non-rotatable spool sleeve 86 that may be secured to the housing 62 via socket bolts 66.

As apparent in FIGS. 4B and 5B, the spool header 64 is rotatably mounted on the spool sleeve 86 for providing limited angular movement of the lever 34 between the one-way clutch and locked mode positions already described. A separate retainer 68 is configured to axially secure the rotatable spool header 64 to the spool sleeve 86. As such, the retainer 68 is fixedly secured to the fixed spool sleeve 86.

Within the housing 62 of the actuator 32, shown herein as a hydraulic actuator, an actuator piston 70 is adapted to move slidably, along an axis B-B parallel to axis A-A, between the one-way clutch and locked mode positions. For this purpose, hydraulic ports (not shown) in communication with the housing 62 accommodate flows of hydraulic fluid (not shown) into and out of the housing in a manner to move the piston axially between the two positions. In FIG. 4B, the hydraulic fluid urges the piston end wall 72 toward the housing end wall 76 in direction of arrow, as shown.

Conversely, in FIG. 5B, hydraulic fluid urges the piston end wall 72 away from the housing end wall 76, as shown by the opposing arrow depicted in the latter view. An actuator plunger 80 is secured to the piston end wall 72 via a securement boss 82 attached to the end wall 72 via a radial locking ring 84. The actuator plunger 80 is adapted to be translated axially along, as well as rotated about, axis B-B, in a manner described below.

The spool header 64 is supported for rotatable movement on the exterior circumference of the fixed spool sleeve 86. The interior circumference of the spool sleeve 86 supports an end portion 78 of the actuator plunger 80 that extends into the spool header 64. It will be noted that the spool sleeve 86 includes a radial flange 88 adapted to axially retain a set of washers and bushings 92 between the open cylindrical end 71 of the actuator piston, the latter being situated opposite the piston end wall 72. Those skilled in the art will appreciate that the set of washers and bushings 92 may be appropriately selected and/or dimensionally adjusted so as to accommodate any required axial tolerances of the actuator piston and spool sleeve parts for proper operation.

A default return spring 90 may be radially interposed between the actuator piston 70 and the actuator plunger 80. As such, the spring 90 is positioned to be axially trapped between the piston end wall 72 and the radial flange 88. In the disclosed embodiment, the spring 90 is adapted to become fully extended (FIG. 4B) in the one-way clutch mode position, which acts as a default position in case of hydraulic failure. Conversely, in the same embodiment the spring 90 becomes compressed under the force of hydraulic pressure in the locked clutch mode position.

As noted, the actuator plunger 80 is both axially translated and rotationally moved via the hydraulic forces to rotate the spool header 64. For causing rotation of the spool header 64, the rotationally fixed spool sleeve 86, which circumferentially supports the spool header 64 to which the actuator lever 34 is secured, incorporates a helical slot 94. The helical slot 94 accommodates an actuator pin 100 fixedly secured to the free end 96 of the actuator plunger 80, i.e. the end opposite the securement boss 82. The pin 100 projects radially outwardly of the center of the rotatable plunger 80, and extends through the helical slot 94.

The extremity of the actuator pin 100 defines a channel tracking end 102 which engages and slides axially within a separate axially extending channel 104 (FIG. 4B) formed on the interior of the spool header 64. The channel 104 is positioned immediately adjacent the helical slot 94, and the actuator pin 100 extends fully radially from the plunger 80 through the slot 94 and into the channel 104. Since the channel 104 is tracked by the end 96 of the actuator pin 100, those skilled in the art will appreciate that when the actuator plunger 80 is axially translated between the one-way and locked clutch mode positions via hydraulic forces, the plunger 80 is forced to rotate via the helical slot 94 which is fixed relative to the housing 62. This action will in turn cause the spool header 64 to rotate relative to the housing 62, thereby forcing the lever 34 to swivel between one-way and locked clutch mode positions.

As a result of the actuator operation described, the actuator 32 thus operates to swivel the lever 32 between one-way and locked clutch mode positions described. Movement of the lever 32 within the slot 41 of the actuator tab 40 is then effective to angularly rotate the actuator ring 24 between the positions described in context of FIGS. 1-3. Among other aspects, those skilled in the art will appreciate that when the spool header 64 and its associated actuator lever 34 move clockwise the actuator ring 24 will move counterclockwise. Conversely, when the lever 34 moves counterclockwise, the actuator ring will move clockwise.

For purposes of both manufacturing economy and weight management, the spool sleeve 86, the spool header 64 and the retainer 68 may be formed of a plastic material, instead of metal. For example, the plastic Nylon 66 as a Zytel (registered trademark) resin manufactured by DuPont can be economically and effectively utilized in an environment saturated with hydraulic fluids. For example, a hydraulic actuator 32 employing such parts was effectively tested over 1 million cycles of movement on the plunger 80 under a maximum pressure load of 20 bars. All other parts of the actuator 32 may be conventionally formed of metal, for example aluminum for weight management considerations.

The structures herein described may have alternative configurations, though not shown. The actuator 32 could for example be actuated electrically instead of hydraulically. In addition, a biasing system involving a structure other than a conventional-style coil spring 90 could be used as a default return spring. Further, the piston 70 and the plunger 80 could be alternatively formed as one element, thereby eliminating need for the separate radial locking ring 84, even though in the latter case, the piston 70 including its end wall 72 would not only move axially with, but would also rotate with, the plunger 80. Although these modifications constitute only three examples, numerous other examples are applicable within the context of this disclosure.

A method of making a multi-mode clutch module 10, including an actuator 32 having a spool header and lever 34 may include steps of providing a pair of inner race plates 20A and 20B to form an inner race, and a separate annular structure to form an outer race 22, with the race plates including reversely oriented pawl apertures 60. The actuator ring 24 and individual pawls 30A, 30B are also provided; the pawls may be inserted into the pawl apertures 60 of a first, 20A, of the pair of inner race plates 20, and after positioning the outer race 22 and the actuator ring 24, the second inner race plate 20B is assembled so as to sandwich the outer race 22 and actuator ring 24 between the two inner race plates 20 along the common axis A-A, while assuring that the pawls 30 are retained within each set of their aligned pawl apertures 60. The assembled inner race 20, pawls 30, outer race 22 and actuator ring 24 may then be inserted into the clutch module housing 12 in a manner such that the outer race 22 is non-rotatably secured to the housing 12, and such that in operation each of the pawls 30 is adapted to disengage from the actuator ring 24 and the outer race 22 under centrifugal force at a predetermined rotational speed of the inner race 20.

The method of making the multi-mode clutch module may also incorporate pawls 30 that comprise elongated hardened steel members having heel ends 54 and toe ends 52, with the heel ends 54 containing more mass than the toe ends 52 for achieving the described centrifugal action.

INDUSTRIAL APPLICABILITY

The clutch module, including the actuator, of this disclosure may be employed in a variety of vehicular applications, including but not limited to, automobiles, trucks, off-road vehicles, and other machines of the type having engines, automatic transmissions, and drivelines.

The disclosed clutch module offers a unique approach to avoiding parasitic drag associated with pawls generally employed to engage inner and outer races of clutches in automatic transmissions. Each pawl may be individually and movably situated between a pair of riveted rotatable inner races, each pawl having its axially oriented lateral ends captured within and/or between pairs of opposed notches for permitting limited angular motion.

To the extent that the heel ends of each pawl are designed to contain more mass, the heel ends may be appropriately weighted so that the toe ends of the pawls may become disengaged from their associated outer race notches at predetermined threshold rotational speeds of the inner race. This approach provides for a relatively simple and reliable reduction of parasitic drag above speeds not requiring continued engagement or interaction of inner and outer race members in, for example, a first (low) and reverse clutch module of an automatic transmission.

What is claimed is:

1. An actuator adapted for use with a multi-mode clutch module having a pair of annular races defined by an inner race and an outer race, a plurality of pawls circumferentially positioned between the inner and outer races, and an actuator ring adapted to selectively control movements of the pawls for locking and unlocking the races together; the actuator comprising:

a housing;

a spool sleeve axially fixed to the housing, the spool sleeve defining an axis, and including a helical slot;

an axially extending piston supported for reciprocal movement within the housing;

an axially translatable elongated plunger having a first end secured to the piston, the plunger being adapted for rotation within the housing;

a pin fixed to and radially extending from a second end of the plunger through the helical slot, the pin having a free end;

a spool header mounted to and adapted to rotate about the spool sleeve, the spool header including an interior axially extending channel adapted to receive the free end of the pin during relative movements between the spool header and the pin;

an actuator lever affixed to the spool header, the lever being adapted to rotate with the spool header between at least two angular positions;

wherein when the pin, extending radially through the slot of the spool sleeve and having its free end engaging the interior channel of the spool header, is actuated via reciprocal movement of the plunger, the pin rotates the spool header, moving the lever between angular positions, in turn moving the actuator ring to selectively block the pawls, so that the inner and outer races may freewheel relative to one another in at least one modular clutch operating mode.

2. The actuator adapted for use with a multi-mode clutch module of claim 1, wherein the actuator ring includes an axially projecting tab having a slot, and wherein the actuator lever engages the slot.

3. The actuator adapted for use with a multi-mode clutch module of claim 1, wherein when the actuator lever moves clockwise, the actuator ring moves counterclockwise and vice versa.

4. The actuator adapted for use with a multi-mode clutch module of claim 1, wherein the actuator housing has an axis coterminous with the axis of the spool sleeve.

5. The actuator adapted for use with a multi-mode clutch module of claim 1, wherein the first end of the plunger has a boss, the piston has a radially extending end wall, and the boss is secured to the end wall.

6. The actuator adapted for use with a multi-mode clutch module of claim 5, further including a radial locking ring, wherein the radial locking ring secures the first end of the plunger to the piston end wall.

7. The actuator adapted for use with a multi-mode clutch module of claim 1, wherein the spool sleeve has a radial flange at one end that is fixedly secured to the actuator housing.

8. The actuator adapted for use with a multi-mode clutch module of claim 7, further comprising a retainer fixedly secured to the spool sleeve at the end of the spool sleeve opposite that of the radial flange end.

9. The actuator adapted for use with a multi-mode clutch module of claim 1, wherein the spool sleeve, spool header, and the retainer are formed of a plastic material.

10. The actuator adapted for use with a multi-mode clutch module of claim 9, wherein the spool sleeve, spool header, and the retainer are formed of Nylon 66 plastic.

11. A multi-mode clutch module, comprising:

a pair of annular races defined by an inner race and an outer race, a plurality of pawls circumferentially positioned between the inner and outer races, and an actuator ring adapted to selectively control movements of the pawls for locking and unlocking the races together;

an actuator including a housing, a spool sleeve axially fixed to the housing, the spool sleeve defining an axis, and including a helical slot, an axially extending piston supported for reciprocal movement within the housing, an axially translatable elongated plunger having a first end secured to the piston, the plunger being adapted for rotation within the housing, a pin fixed to and radially extending from a second end of the plunger through the helical slot, the pin having a free end, a spool header mounted to and adapted to rotate about the spool sleeve, the spool header including an interior axially extending channel adapted to receive the free end of the pin during relative movements between the spool header and the pin, and an actuator lever affixed to the spool header, the lever being adapted to rotate with the spool header between at least two angular positions;

wherein when the pin, extending radially through the slot of the spool sleeve and having its free end engaging the interior channel of the spool header, is actuated via reciprocal movement of the plunger, wherein the pin rotates the spool header, moving the lever between angular positions, in turn moving the actuator ring to selectively block the pawls, so that the inner and outer races may freewheel relative to one another in at least one modular clutch operating mode.

12. The multi-mode clutch module of claim 11, wherein the actuator ring includes an axially projecting tab having a slot, and wherein the actuator lever engages the slot.

13. The multi-mode clutch module of claim 11, wherein when the actuator lever moves clockwise, the actuator ring moves counterclockwise and vice versa.

14. The multi-mode clutch module of claim 11, wherein the actuator housing has an axis coterminous with the axis of the spool sleeve.

15. The multi-mode clutch module of claim 11, wherein the first end of the plunger has a boss, the piston has a radially extending end wall, and the boss is secured to the end wall.

16. The multi-mode clutch module of claim 15, further including a radial locking ring, wherein the radial locking ring secures the first end of the plunger to the piston end wall.

17. The multi-mode clutch module of claim 11, wherein the spool sleeve has a radial flange at one end that is fixedly secured to the actuator housing, and wherein the plunger is encased by a spring, the spring is contained between the radial flange and piston endwall, and wherein the spring is adapted to push the plunger axially to a default position in event of a power failure.

18. The multi-mode clutch module of claim 17, further comprising a retainer fixedly secured to the spool sleeve at the end of the spool sleeve opposite that of the radial flange end.

19. The multi-mode clutch module of claim 11, wherein the spool sleeve, spool header, and the retainer are formed of a plastic material.

20. The multi-mode clutch module of claim 19, wherein the spool sleeve, spool header, and the retainer are formed of Nylon 66 plastic.

* * * * *